ELECTROMAGNETIC SWITCHING DEVICE IN COORDINATE ARRAYS

ELECTROMAGNETIC SWITCHING DEVICE IN COORDINATE ARRAYS

Filed April 26, 1967

3 Sheets-Sheet 3

United States Patent Office 3,464,039

Patented Aug. 26, 1969

3,464,039

ELECTROMAGNETIC SWITCHING DEVICE IN COORDINATE ARRAYS

Masao Takamura, Shoji Mitsuishi, Katsuhiro Kato, Takeo Shinohara, Hisaei Kikuchi, and Sadayuki Mitsuhasi, Tokyo, Japan, assignors to Nippon Telegraph and Telephone Public Corporation and Nippon Electric Company Limited, Tokyo, Japan, both corporations of Japan Filed Apr. 26, 1967, Ser. No. 633,979
Claims priority, application Japan, Apr. 30, 1966, 41/27,116
Int. Cl. H01h 67/14
U.S. Cl. 335—112 2 Claims

ABSTRACT OF THE DISCLOSURE

A plurality of sets of multiple straps constituting lines and columns of a matrix is composed of an electro-conductive magnetic material. An exciting winding for cross point selection is wound around each one of a pair of magnetic cores projecting perpendicularly to the plane of the matrix at each one of the cross points of lines and columns, and a reed switch acting as a speech path contact is connected between each pair of said magnetic cores. A perforated base plate made of soft magnetic material is inserted between the plane of the matrix and the exciting winding to avoid induction noise to a pair of multiple straps.

This invention relates to an electromagnetic switching device in coordinate arrays and more particularly to a device wherein multiple straps are utilized to act as a portion of a magnetic circuit associated with a reed switch at each cross point.

Such switching devices in coordinate arrays are mainly utilized in electronic switching system of the space division type. These devices are usually required to have reduced occupied space, simplified construction, low cost, low power consumption and high speed operation.

As well known electromagnetic switching devices in coordinate arrays for use as speech path devices in electronic telephone exchanges of the space division type, there have been used so-called Ferreed switches as disclosed in The Bell System Technical Journal, vol. XLIII, September 1964, No. 5, wherein a plurality of reed switches are arranged perpendicularly to a magnetic shunt plate at respective cross points on a matrix with the air gaps between contacts lying on the plane thereof. Around each reed switch is arranged a semi-hard magnetic core in parallel therewith, the direction of magnetization of the core being reversed by an exciting winding wound around the core to open and close the contact of the reed switch. With this arrangement said magnetic core is necessary at each cross point, and much labor and time will be required for the fabrication. Further as it is necessary to provide multiple straps in addition to the magnetic circuits for driving reed switches, not only is the construction complicated but also the manufacturing cost is high.

In construction, straps arranged in lines and columns of a matrix are composed of an electroconductive magnetic material so that these multiple straps act as a portion of a magnetic circuit for driving reed switch at each cross point, and cross point selecting windings are respectively wound around each pair of magnetic cores projecting perpendicularly to the plane of the matrix at each cross point. Further a reed switch in parallel with the plane of the matrix is connected magnetically and electrically between each pair of magnetic cores, and another end of each core is fixed respectively to the different multiple straps which are magnetically connected but electrically insulated from each other, so that said straps forms a portion of a magnetic circuit for driving reed switch as a yoke. Two cores connected to both sides of reed switch have a predetermined distance to permit stable on-off operations of the switch contacts without utilizing any magnetic shunt. Said exciting winding of each cross point comprises, for example, a first winding wound around a core successively in the direction of columns, and a second winding wound around a plurality of said first windings in the direction of lines. With this construction, where the multiple strap of line and column of matrix and the magnetic cores at each cross point are constructed integrally with a unitary semi-hard magnetic material, it is possible to reduce the number of component parts required and the cost of fabrication. The improved switching device of this invention is constructed on the basis of the principles shown in FIGS. 1*a* and 1*b*. The invention thus provides a coordinate array switching device in which the amount of the induction noise induced in a pair of multiple straps by a drive current flowing through windings is small and in which the magnetic characteristics are excellent.

While the specification concludes with claims particularly pointing out and distinctly claiming the subject matter which is regarded as the invention, it is believed that the invention will be better understood from the following description taken in connection with the accompanying drawings, in which:

FIGS. 1*a* and 1*b* are diagrammatic connection diagrams of an electromagnetic switching device in coordinate arrays useful to explain the principle of this invention;

Although the electromagnetic switching device in coordinate arrays can be utilized in various applications, for the sake of explanation, application thereof to an electronic telephone exchange will be described hereunder.

Figure 1A:
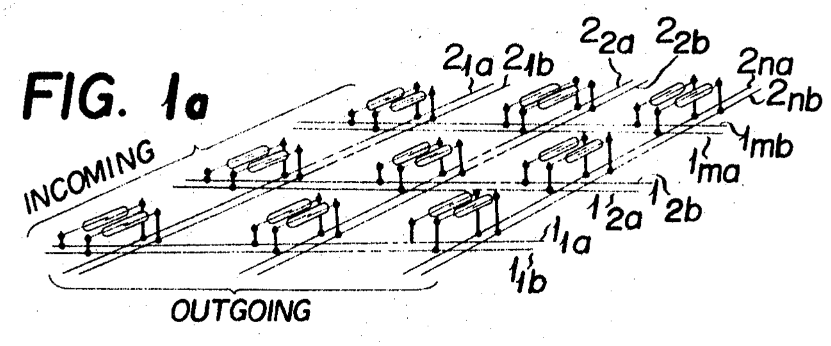

In the arrangement shown in FIG. 1*a*, a plurality of sets of multiple strap of incoming and outgoing are shown in case of two-wire switching. Multiple straps $1_{1a}$, $1_{1b}$, $1_{2a}$, $1_{2b}$, . . . $1_{ma}$, $1_{mb}$ comprising lines and multiple straps $2_{1a}$, $2_{1b}$, $2_{2a}$, $2_{2b}$, . . . $2_{na}$, $2_{nb}$ comprising columns of a matrix are electrically insulated from each other. The multiple straps are made of an electroconductive magnetic material.

Figure 1B:
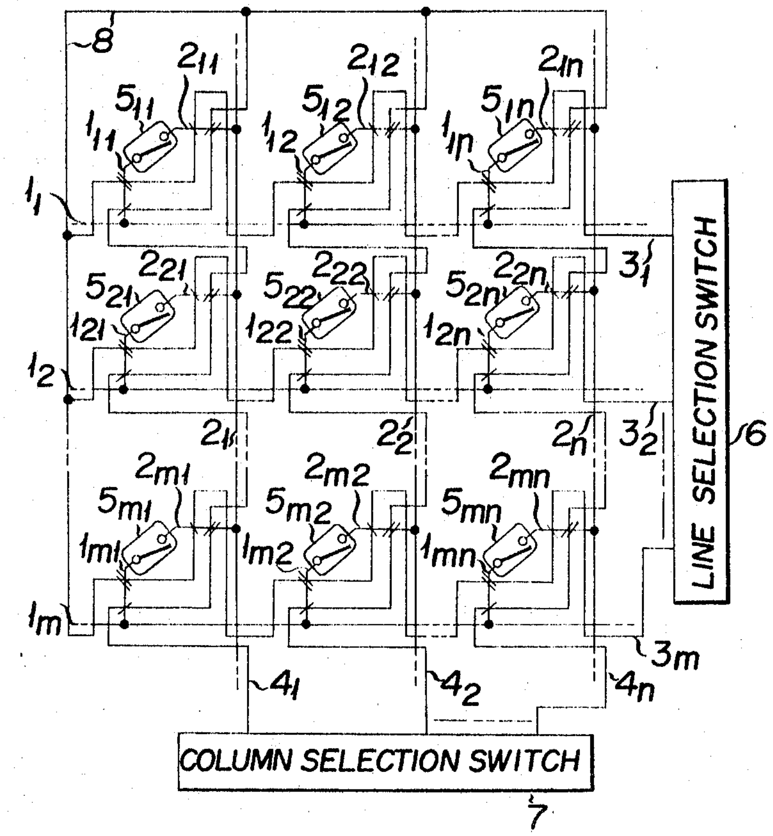

As schematically indicated in FIG. 1*b*, a plurality of magnetic cores of electroconductive magnetic material $1_{11}$, $1_{12}$, . . . $1_{1n}$; $1_{21}$, $1_{22}$, . . . $1_{2n}$; $1_{m1}$, $1_{m2}$, . . . $1_{mn}$; $2_{11}$, $2_{12}$, . . . $2_{1n}$; $2_{21}$, $2_{22}$, . . . $2_{2n}$; and $2_{m1}$, $2_{m2}$, . . . $2_{mn}$ are provided at respective cross points and project from respective multiple strap of lines and columns. Said cores are coupled magnetically and electrically to said multiple straps. A plurality of read switches $5_{11}$, $5_{12}$, . . . $5_{mn}$ of total number of $m \times n$ are connected electrically and magnetically between respective pairs of magnetic cores associated with respective cross points.

Each of the magnetic cores carries exciting windings. Groups of exciting windings for respective lines and columns of the matrix are respectively connected in series by conductors $3_1$, $3_2$, . . . $3_m$ and $4_1$, $4_2$, . . . $4_n$ and one end of each of these serially connected exciting windings is connected to a terminal of a line selection switch 6 and to a column selection switch 7, respectively, and other ends are connected to a common conductor 8. As will be described later more in detail said exciting coils are connected in the well known differential excitation manner to permit selection and connection of any desired cross point.

Figures 2, 3, 4, 5, 6:
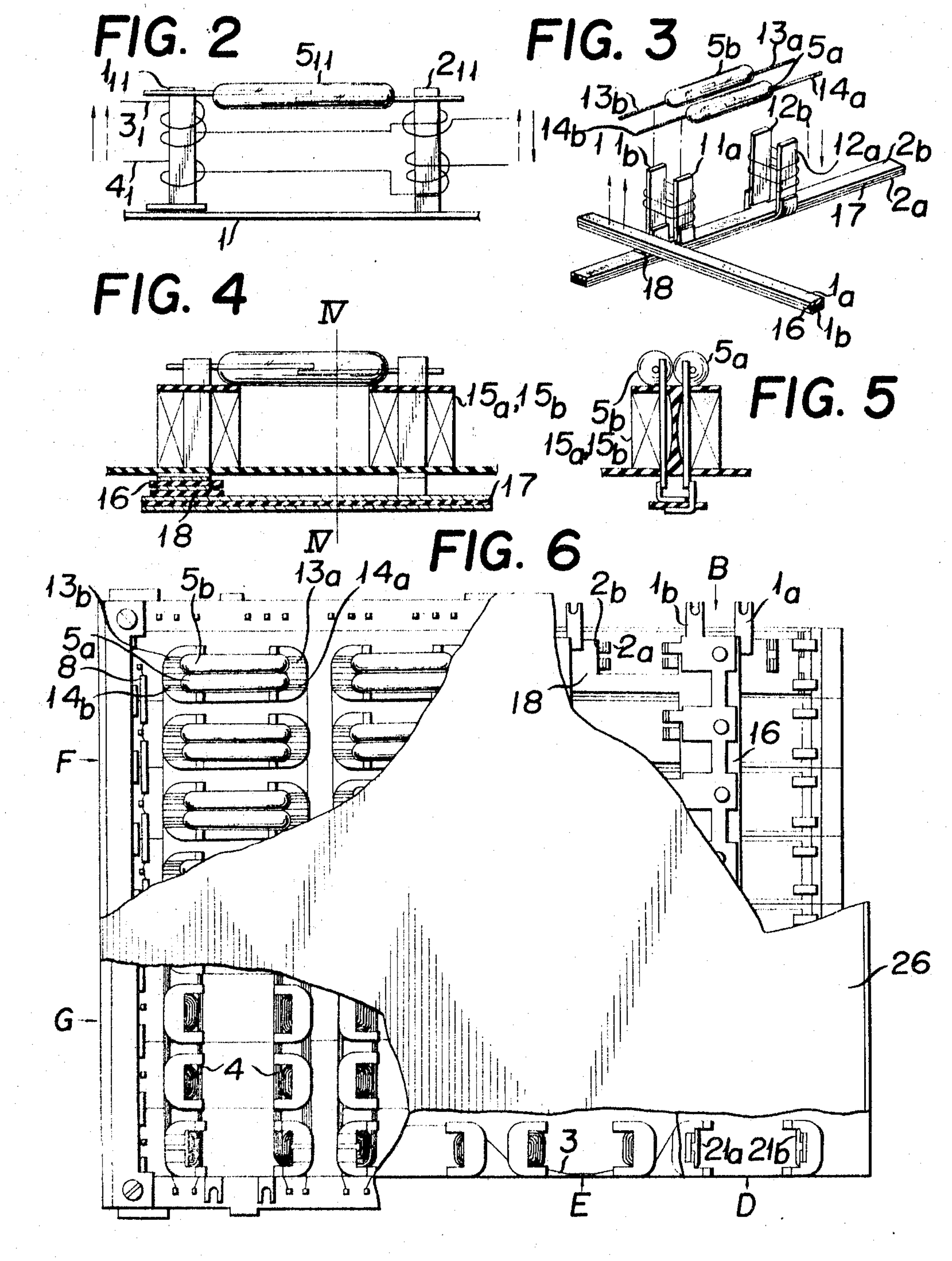
FIG. 2 is a diagrammatic view of various components associated with one cross point, also useful to explain the principle of the operation of the switches shown in FIGS. 1*a* and 1*b*.
FIG. 3 is a schematic perspective view also illustrating various components associated with one cross point.
FIG. 4 shows a schematic cross section also illustrating various components associated with one cross point.
FIG. 5 is a sectional view taken along a line IV—IV in FIG. 4.
FIG. 6 is a plan view, partly broken away, of one embodiment of this invention.

The arrangement of differential excitation of windings associated with one cross point of the device shown in FIG. 1*b* will now be considered by referring to FIG. 2. Thus, an exciting winding connected to one conductor, for example $3_1$, belonging to a line comprises two portions having a turn ratio of about 2:1, for example, and two windings are wound in counterwise to each other around cores $1_{11}$ and $2_{11}$, respectively. In a similar manner, each exciting winding connected to one conductor, for example $4_1$, belonging to a column comprises two portions having a turn ratio of about 1:2 and two windings are wound in counterwise to each other around cores $1_{11}$ and $2_{11}$, respectively.

When the remanent magnetization of cores $1_{11}$ and $2_{11}$ by the differential windings are samewise each other, as indicated by solid line arrows shown in FIG. 2, a closed magnetic path will be formed through core $1_{11}$, reed switch $5_{11}$, core $2_{11}$ and magnetic strap 1, whereby the contacts of the reed switch $5_{11}$ will be closed. On the other hand, when the remanent magnetization of cores $1_{11}$ and $2_{11}$ by the differential windings are counterwise each other, as indicated by dotted line arrows shown in FIG. 2, the magnetic flux at the contact of reed switch $5_{11}$ will be nearly zero, thereby the contact will be opened.

Returning back to FIG. 1*b*, in order to close the contacts of a reed switch at a cross point, for example the reed switch $5_{11}$ at the cross point of the line $1_1$ and the column $2_1$, a voltage is impressed across conductor $3_1$ and conductor $4_1$. In this case, the reed switch $5_{11}$ will be closed and remaining reed switches $5_{12}$, $5_{13}$, . . . $5_{1n}$ on the line $1_1$ and reed switches $5_{21}$, . . . $5_{m1}$ on the column $4_1$ will be opened by the remanent magnetization of the cores produced by the exciting current in differential excitation manner, thereby the interconnection between incoming $1_1$ and outgoing $2_1$ will be completed.

One example of the construction of a cross point will be described hereunder by referring to FIGS. 3 through 5. As shown in FIG. 3, each of the lines comprises composite straps 1*a* and 1*b* made of an electroconductive magnetic material and utilized as multiple straps extending in the direction of line. Likewise, each column comprises composite straps 2*a* and 2*b* similarly made of an electroconductive magnetic material and utilized as multiple straps extending in the direction of columns. Cores 11*a*, 11*b*; and 12*a*, 12*b* made of a semi-hard magnetic material are secured to composite straps 1*a*, 1*b* and 2*a*, 2*b*, respectively, at each cross point perpendicularly to the plane of the matrix. Terminals 13*a*, 13*b* and 14*a*, 14*b* of two reed switches 5*a* and 5*b* are respectively connected electrically and magnetically to the upper ends of these magnetic cores 11*a*, 11*b* and 12*a*, 12*b*.

Electric insulators 16 and 17 are interposed respectively between magnetic straps 1*a* and 1*b*, and between 2*a* and 2*b*. Also an electric insulator 18 is interposed between straps 1*b* and 2*b*. As clearly shown in FIGS. 4 and 5, exciting windings 15*a* and 15*b* are commonly provided for two reed switches 5*a* and 5*b*.

A practical example of the electromagnetic switching device in coordinate arrays constructed as above in accordance with the principle of this invention will be described hereunder. As shown by the portion B, FIG. 6, and the portion C, FIG. 7, a pair of multiple straps 1*a* and 1*b* between which is interposed an insulator 16 and to which magnetic cores 11*a* and 11*b* are connected, are mounted on a base plate 20 to extend in the direction of lines. Similarly, composite multiple straps 2*a* and 2*b* provided with magnetic cores 12*a* and 12*b* are mounted upon the base plate 20 through an insulator plate 18 to extend in the direction of columns. As shown by a portion D, FIG. 6, and by a portion C, FIG. 7, magnetic cores 11*a*, 11*b* and 12*a*, 12*b* extend through the base plate 20 to the opposite side thereof and further through bobbins 21*a* and 21*b* made of a synthetic resin secured on the same side, the outermost ends 22*a* and 22*b* of these cores are bent as shown.

Figure 7:
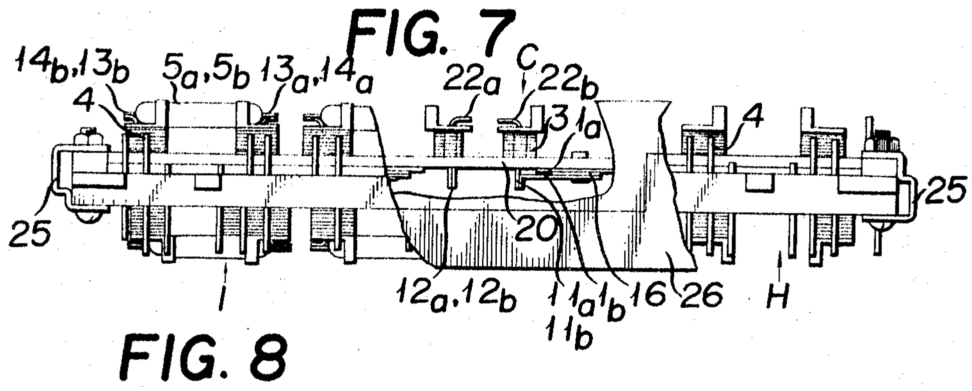
FIG. 7 is a side view, partly broken away, of the embodiment shown in FIG. 6.
Figure 8:
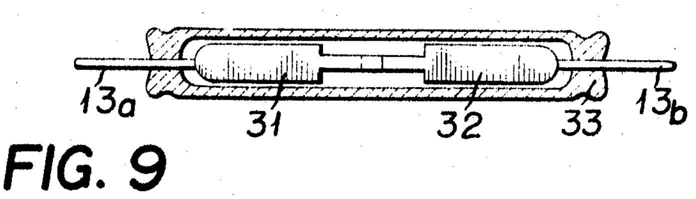
FIG. 8 is a plan view, partly in longitudinal section of a reed switch employed in this invention.

As shown at portions E of FIG. 6 and C of FIG. 7, two portions of an exciting winding 3 for selecting a cross point of line are wound on the bobbins 21*a* and 21*b* in a differential exciting manner and at a turn ratio of about 2:1 for example. As shown by the portion E of FIG. 6 these portions of the exciting winding 3 are successively wound in series along one line and one terminal of the winding is connected to one terminal of the line selection switch 6 shown in FIG. 1*b* while the other to the common conductor 8 as shown by the portion F in FIG. 6.

As shown by portions G, FIG. 6, and H, FIG. 7, an exciting winding 4 extending in the direction of columns is wound around a plurality of exciting windings 3 extending in the direction of lines. Similarly, one end of the exciting winding 4 is connected to one terminal of the column selection switch 7 shown in FIG. 1*b* and the other end to the common conductor 8.

After completing the winding operation, terminals 13*a*, 13*b* and 14*a*, 14*b* of reed switches 5*a* and 5*b* are connected to bent portions 22*a* and 22*b*, shown at the portion C of FIG. 7 of magnetic cores 11*a*, 11*b* and 12*a*, 12*b*, respectively, to obtain an arrangement as shown by the portion I of FIG. 7. A pair of devices constructed as above described is clamped together by means of clamping means 25, shown in FIG. 7, and a cover plate 26 is then applied to complete the electromagnetic switching device of this invention.

Figure 9:
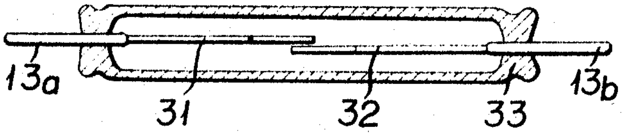
FIG. 9 is a side view of the reed switch shown in FIG. 8.
Figure 10:
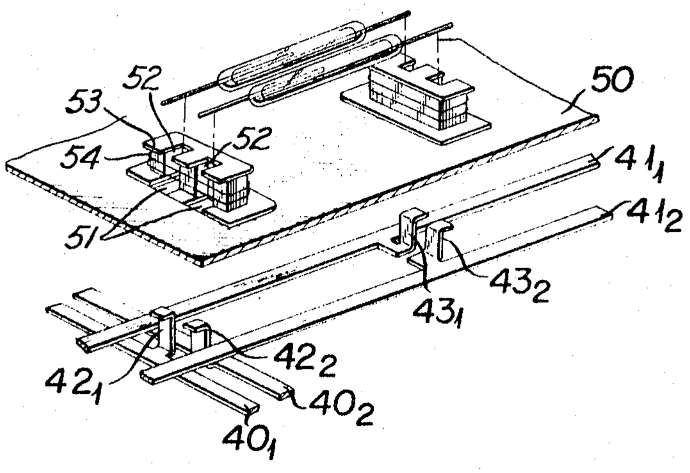
FIG. 10 is an exploded perspective view of various components associated with one cross point of an embodiment of this invention.

The reed switch utilized in this invention may have a construction as shown in FIGS. 9 and 10. Like a conventional reed switch, it comprises a pair of reeds 31 and 32 hermetically sealed in a glass tube 33. It is preferable to set the ratio between the cross sectional area near the outer end of the reeds 31 and 32 and that near their inner ends of contacts to be about 1:2. These reeds are magnetized by means of pole pieces (not shown) coupled to their terminals. Further it is designed such that any portion of the reeds would not be magnetically saturated when the reed switch is operated and that upon closure of the contacts portions of the reed adjacent their contacts become magnetically saturated to provide a constant contact force.

While in the above embodiment, a pair of separately formed magnetic cores was connected to the multiple straps made of electroconductive magnetic material, magnetic cores $42_1$, $42_2$, $43_1$ and $43_2$ may be made integral with multiple straps $40_1$, $40_2$ and $41_1$, $41_2$, respectively in the direction of lines and columns, made of semi-hard magnetic material, as shown in FIG. 10. This design further reduces the number of component parts and hence the manufacturing cost. In this construction, the base plate 50 is made of a soft magnetic material and electrically insulated from multiple straps $40_1$, $40_2$, $41_1$, $41_2$. This base plate acts as magnetic yoke between projected portions $42_1$, $42_2$ and portions $43_1$, $43_2$ from multiple straps, and also acts as a magnetic shield plate for the induction noise on the multiple straps. Pairs of perforated holes 51 are provided in said base plate 50 in the positions respectively corresponding to pairs of projecting core members $42_1$, $42_2$ and $43_1$, $43_2$. Bobbins having pairs of apertures 52 corresponding to pairs of perforated holes 51 are provided in the base plate 50. Coils 54 will be wound around said bobbins 53. Therefore, in this construction a pair of multiple straps need not be piled up as the embodiment shown in FIG. 3. Other portions are constructed in the same manner as in the foregoing embodiment so that description thereof is believed to be unnecessary.

While the invention has been explained by describing particular embodiments thereof, it will be apparent that improvements and modifications may be made without departing from the scope of the invention as defined in the appended claims.

What is claimed is:

1. A coordinate array of electromagnetic switching devices comprising:

a plurality of sets of multiple connecting conductors made of electroconductive magnetic material arranged in a plane to form a matrix of lines and columns defining a plurality of cross points, said conductors having cores of electroconductive material projecting therefrom substantially perpendicularly with respect to the plane of said matrix at each cross point of said matrix;

exciting windings wound around said cores;

a perforated base plate made of magnetic material insulatingly mounted between the connecting conductors of the matrix and said exciting windings in a plane substantially parallel to the plane of said matrix, said cores projecting through said perforations in said base plate; and a plurality of reed switches, each switch being connected to the portions of a pair of said cores at respective cross points which project through said base plate, said base plate acting as a magnetic yoke and as a magnetic shield plate between said reed switches and said connecting conductors.

2. Apparatus according to claim 1 wherein said perforated base plate is common to all of the cross points in said array.

References Cited

UNITED STATES PATENTS

| | | | |
|---|---|---|---|
| 3,188,423 | 6/1965 | Glenner | 335—152 |
| 3,303,442 | 2/1967 | McKeon | 335—154 |

BERNARD A. GILHEANY, Primary Examiner

H. BROOME, Assistant Examiner